United States Patent [19]

Bott

[11] 4,428,517

[45] * Jan. 31, 1984

[54] VEHICLE LUGGAGE RACK

[76] Inventor: John A. Bott, 931 Lakeshore Dr., Grosse Pointe Shores, Mich. 48236

[*] Notice: The portion of the term of this patent subsequent to Aug. 3, 1999 has been disclaimed.

[21] Appl. No.: 401,745

[22] Filed: Jul. 26, 1982

Related U.S. Application Data

[63] Continuation of Ser. No. 204,478, Nov. 6, 1980, Pat. No. 4,342,411, which is a continuation of Ser. No. 13,524, Feb. 21, 1979, abandoned.

[51] Int. Cl.³ .............................................. B60R 90/04
[52] U.S. Cl. .................................... 224/326; 224/319; 224/324; 224/325
[58] Field of Search ................... 224/309, 314-321, 224/324-328; 280/769; 248/187

[56] References Cited

U.S. PATENT DOCUMENTS

| Re. 26,539 | 3/1969 | Bott | 224/321 |
|---|---|---|---|
| 3,223,301 | 12/1965 | Helm | 224/326 |
| 3,223,302 | 12/1965 | Helm | 224/326 X |
| 3,724,730 | 4/1973 | Olsen et al. | 224/309 |
| 4,274,570 | 6/1981 | Bott | 224/326 X |

FOREIGN PATENT DOCUMENTS 713791 8/1954 United Kingdom ............... 224/321

Primary Examiner—William Price
Assistant Examiner—Gary E. Elkins
Attorney, Agent, or Firm—Harness, Dickey & Pierce

[57] ABSTRACT

A vehicle luggage carrier is disclosed which includes a plurality of four stanchion members located one at each of the four corners of the luggage carrier; each of the stanchion members comprises upper and lower stanchion parts which may be fabricated of the same or different materials and which are secured to the associated vehicle roof by fastening elements which extend generally vertically downwardly through the stanchion parts into the roof surface. A utility bar may be associated with laterally aligned pairs of stanchion members and be secured to the rack by means of the same fastening elements securing the upper and lower stanchion parts to the vehicle surface.

23 Claims, 6 Drawing Figures

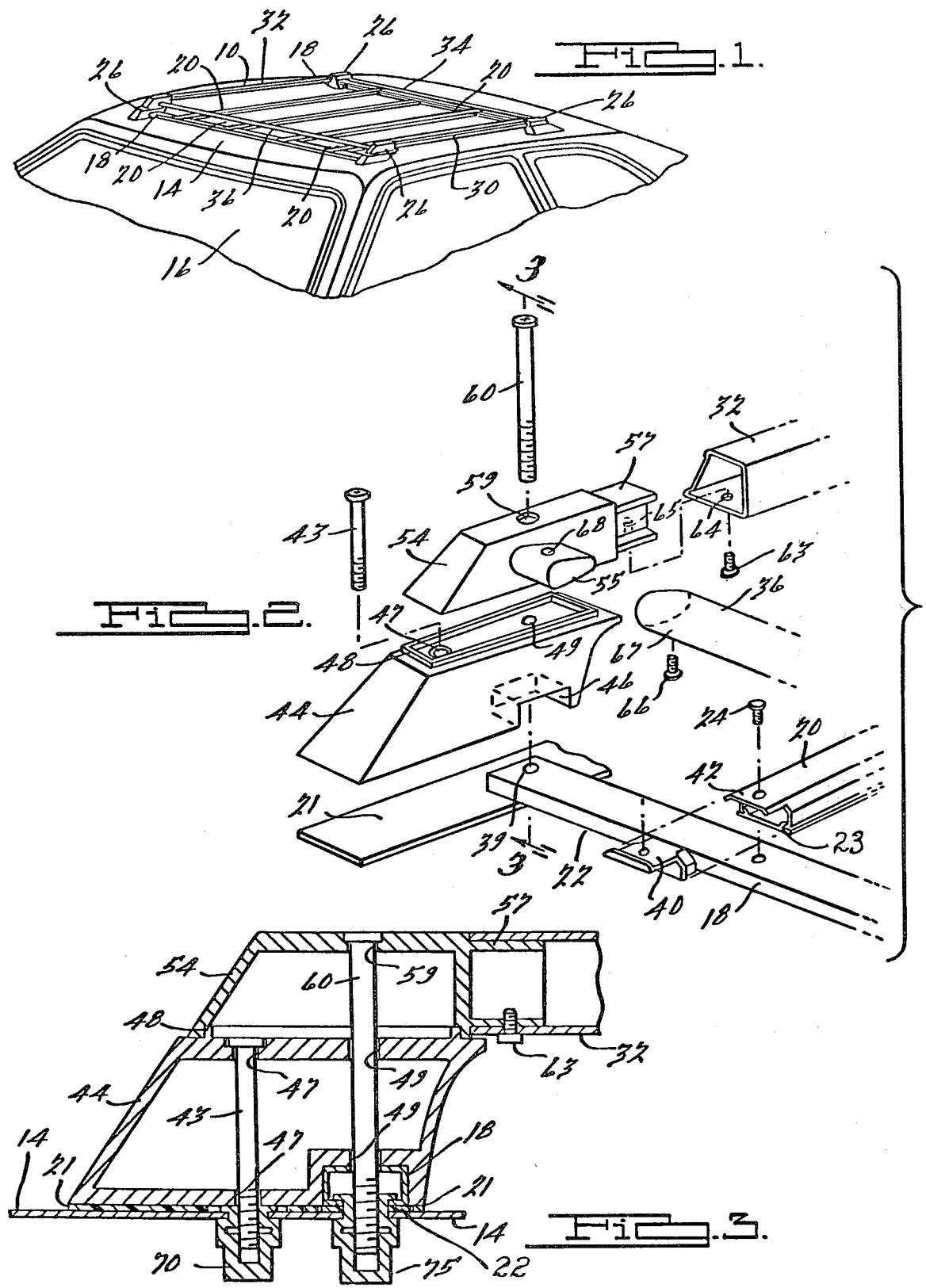

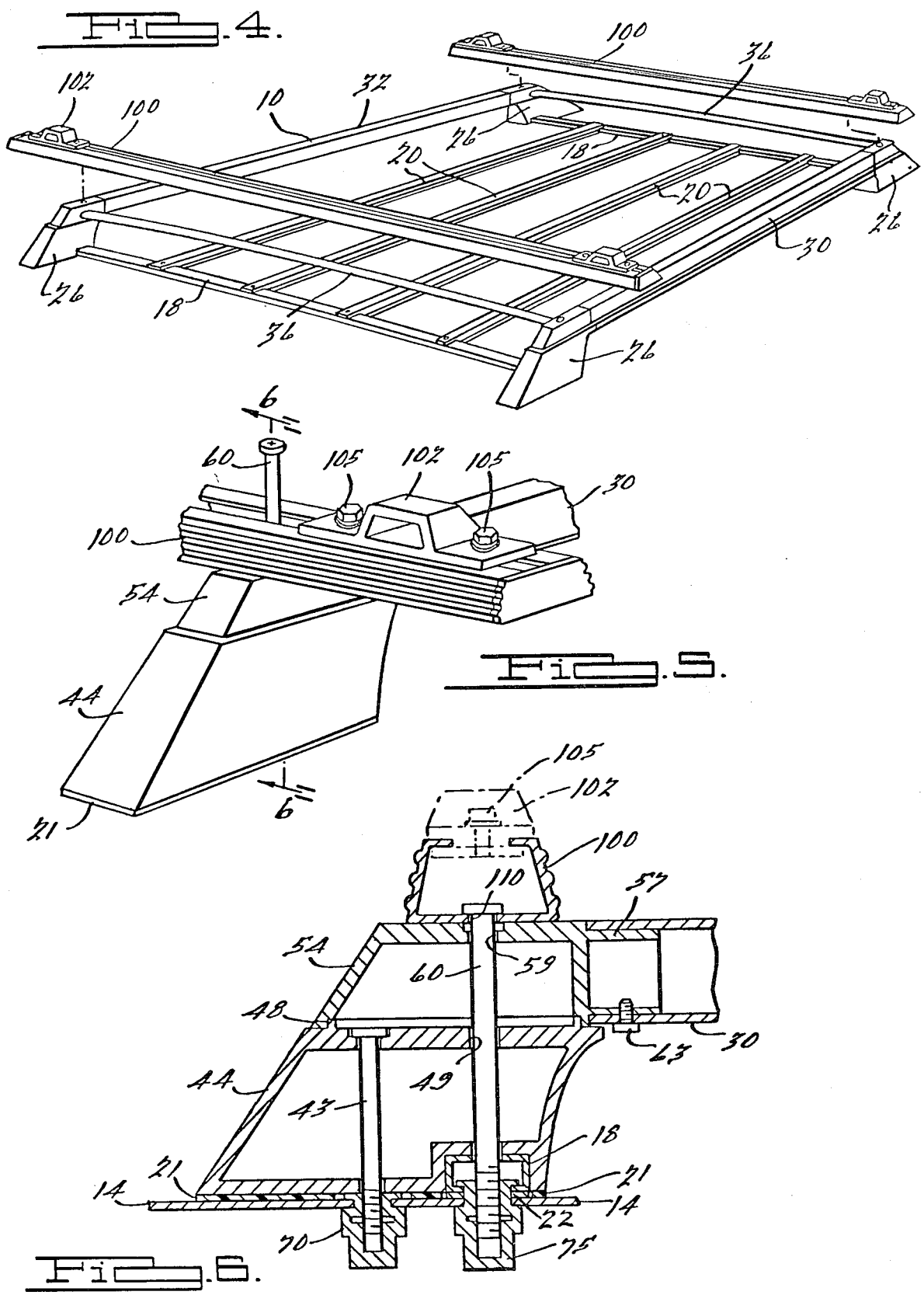

VEHICLE LUGGAGE RACK

This is a continuation of application Ser. No. 204,478, filed Nov. 6, 1980 and now U.S. Pat. No. 4,342,411, issued Aug. 3, 1982 which is a continuation of Ser. No. 13,524, filed Feb. 21, 1979, and now abandoned.

BACKGROUND AND SUMMARY OF THE INVENTION

The present invention is generally directed toward a new and improved vehicle luggage rack or carrier of the type comprising a pair of longitudinally spaced, laterally extending crossrails, and a pair of laterally spaced, longitudinally extending side rails, the adjacent ends of the side and crossrails being supported at each of the four corners of the luggage rack by means of a stanchion member, which stanchion members are constructed in accordance with the principles of the present invention. In particular, the stanchion members each comprise upper and lower stanchion parts which are adapted to be fabricated of the same or different materials, depending upon the particular application of the luggage rack, with the upper stanchion parts including mounting bosses which are adapted for telescopic engagement with the confronting ends of the side and crossrails for supporting the rails upon the vehicle. The upper stanchion part of each of the stanchion members is secured to the associated lower stanchion part by a single fastening element in the form of a threaded screw, bolt or the like which extends generally vertically downwardly through the lower stanchion part into the associated vehicle roof. The luggage rack is preferably provided with a plurality of luggage supporting slats which are also intended to be secured to the vehicle roof by the same fastening elements which secure the upper stanchion parts to the associated lower stanchion parts. An additional feature of the present invention resides in the fact that utility bars may be provided at the forward and rearward ends of the luggage rack and be secured thereto by the aforementioned fastening members, thereby minimizing the component parts of the present invention to the extreme.

It is accordingly a general object of the present invention to provide a new and improved luggage rack or carrier having a plurality of stanchion members, each of which comprises upper and lower stanchion parts or sections which may be fabricated of the same or different materials.

It is a related object of the present invention to provide a new and improved luggage carrier of the above-described type wherein the upper stanchion parts of each of the stanchion members includes means for supporting the associated side and crossrails of the luggage carrier.

It is a further object of the present invention to provide a new and improved luggage carrier, as above described, wherein the upper stanchion part of each of the stanchion members is secured to the associated lower stanchion part by means of a single fastening element.

It is a further object of the present invention to provide a new and improved luggage carrier of the above-described type which may be operatively associated with utility bars that extend generally laterally of the luggage rack and are secured to the stanchion members by the same fastening means securing the upper stanchion parts to the associated lower stanchion parts, whereby the luggage rack may be adapted to carry relatively large or bulky loads, such as ladders, boats, large parcels, etc.

It is still another object of the present invention to provide a new and improved luggage carrier of the above-described type wherein the number of different component parts required for the entire assemblage is minimized to the extreme so as to reduce tooling and inventory costs accordingly.

It is still another object of the present invention to provide a new and improved luggage carrier which is of a pleasant appearance, is economical to manufacture and will have a long and effective operational life.

Other objects and advantages of the present invention will become apparent from following detailed description taken in conjunction with the accompanying drawings.

BRIEF DESCRIPTION OF THE DRAWINGS

FIG. 1 is an elevated perspective view of a portion of an automotive vehicle having the new and improved vehicle luggage carrier of the present invention in operative association therewith;

FIG. 2 is an exploded assembly view of one corner portion of the luggage carrier illustrated in FIG. 1;

FIG. 3 is an enlarged fragmentary cross-sectional view of one of the stanchion members embodied in the luggage carrier of the present invention;

FIG. 4 is an elevated perspective view of an alterante embodiment of the luggage carrier of the present invention;

FIG. 5 is an elevated fragmentary perspective view of one of the stanchion members embodied in the luggage carrier shown in FIG. 4; and FIG. 6 is an enlarger cross-sectional view similar to FIG. 3 of the embodiment of the luggage carrier of the present invention shown in FIGS. 4 and 5.

DESCRIPTION OF THE PREFERRED EMBODIMENTS

Referring now in detail to the drawings and in particular to FIG. 1 thereof, a vehicle luggage rack or carrier 10, in accordance with one preferred embodiment of the present invention, is shown in operative association with an automotive vehicle 12 having a substantially flat roof portion 14 extending rearwardly of the vehicle windshield 16. The luggage rack 10 includes a pair of longitudinally spaced, laterally extending load supporting slats 18 and a plurality of longitudinally extending, laterally spaced load supporting slats 20, which slats 18, 20 are disposed directly adjacent the upper surface of the roof portion 14 and are intended to underlie luggage or other articles which are carried by the rack 10, in a manner well known in the art. The luggage rack 10 of the present invention also includes a pair of identical, longitudinally extending, laterally spaced tubular side rails 30 and 32 which are secured at the longitudinally opposite ends thereof to a plurality of four stanchions, generally designated by the numeral 26, that are located one at each of the four corners of the rack 10. A pair of longitudinally spaced, laterally extending crossrails 34, 36 extend transversely between and are secured at the laterally opposite ends to the stanchions 26 in a manner hereinafter to be described. The stanchions 26 are fixedly secured upon the vehicle roof portion 14 in a manner hereinafter to be described.

As best seen in FIG. 2, the laterally extending slats 18 will be seen to be supported upon the upper surface of the roof 14 by means of suitable relatively resilient or compliant support pads, generally designated by the numeral 22. In a similar manner, the plurality of longitudinally extending slats 20 are spaced from the upper surface of the roof 14 by means of suitable pads 23. The longitudinally opposite ends of the slats 20 are fixedly secured to the laterally extending slats 18 by means of suitable fastening members, such as threaded screw fasteners 24 which extend downwardly through longitudinally extending flange portions 42 provided at the opposite ends of the slats 20 and are threadably secured within suitable apertures within the slats 18. Preferably, the opposite ends of the longitudinally extending slats 20 are provided with end fittings 40 which are interposed between the ends of the slats 20 and the transverse slats 18 and are provided with raised shoulders around the periphery thereof to afford protection against any sharp edges which may be prevalent on the flange portions 42 and to provide a pleasant appearing connection between the slats 18, 20. The laterally opposite ends of each of the cross slats 18 is provided with a suitable aperture 39 (see FIG. 2) which functions in a manner hereinafter to be described in providing a means for securing the assemblage consisting of the slats 18, 20 and the plurality of stanchions 26 upon the vehicle roof 14.

In accordance with the principles of the present invention, each of the stanchions 26 consists of an upper stanchion part 54 and a lower stanchion part 44. The stanchion construction is best illustrated in FIGS. 2 and 3 wherein it will be seen that the lower stanchion part 44 of each of the stanchions 26 is of a generally hollow construction and is provided with a pair of spaced apart apertures or bores 47 and 49 which extend vertically the entire distance through the stanchion parts 44. The lower laterally inboard side of each of the stanchion parts 44 is provided with a generally rectangular-shaped notch or recess 46 which is aligned with the aperture 49 and adapted to nestingly receive the laterally outer end of the associated of the slats 18 in a manner such that the aperture 39 in said adjacent or associated slat 18 is aligned with the aperture 49, whereby a single fastening element which functions to secure the associated upper stanchion part 54 to the lower stanchion part 44 also serves to secure the adjacent end of the slat 18 to the vehicle roof 14. Each of the lower stanchion parts 14 is also adapted to be secured to the roof 14 atop a suitable resilient pad 21 by means of a fastening element 43 in the form of a suitable threaded screw, bolt or the like which extends downwardly through the apertures 47. The upper end of the aperture 47 is preferably countersunk, whereby the bolt head may be arranged flush with the upper surface of the lower stanchion part 44 and below a generally rectangular-shaped positioning shoulder 48 formed integrally of the upper surface thereof which functions to orient or position the upper stanchion part 54 thereupon during assembly of the luggage rack 10 of the present invention.

As also best illustrated in FIGS. 2 and 3, the upper stanchion part 54 of each of the stanchions 26 is provided with a relatively flat upper surface and is of a generally hollow construction consistent with the desired economies of weight and material for modern automotive vehicles. Each of the upper stanchion parts 54 is provided with a suitable vertically extending bore 59 which, when the part 54 is mounted upon the associated lower part 44, is aligned with the bore 49 therein, whereby a suitble fastening means in the form of a threaded bolt 60 may extend downwardly through the bore 59 and aligned bores 49 and 39 of the lower stanchion part 44 and associated slat 18, respectively. Preferably, the upper end of the bore 59 is countersunk, whereby the head of the bolt 60 may be flush with the upper surface of the upper stanchion part 54.

Each of the upper stanchion parts 54 is provided with a longitudinally extending shoulder or boss 57 which is adapted for telescopic engagement interiorly of the adjacent end of one of the longitudinally extending side rails 32, with means in the form of a suitable screw, bolt or the like 63 extending upwardly through a suitable bore 64 in the adjacent end of the side rail 32 for securing the side rails 32 to the mounting boss 57. In a similar manner, each of the upper stanchion parts 54 is provided with a laterally inwardly extending mounting boss 55 which is adapted for telescopic engagement interiorly of the adjacent end of the associated crossrail 36. Preferably, the cross-sectional shape of the mounting bosses 57 and 55 are complementary with respect to the cross-sectional shapes of the interior of the rails 32 and 36, and means in the form of a suitbal screw, bolt or the like 66 extending upwardly through a suitable aperture 67 is employed for fixedly securing the opposite ends of the crossrails 36 to the mounting bosses 55. The lower ends of the bolts 43, 60 of each of the stanchions 26 may be secured to the roof 14 by any suitable means, for example, by means of threaded fastening members known in the art as riv-nuts and identified in the drawings by the numerals 70 and 75, respectively. Of course, various alternative fastening means which cooperate with the bolts 43, 60 may be utilized without departing from the scope of the present invention.

A particular feature of the present invention resides in the fact that the exception of the upper stanchion parts 54, all duplicate components of the luggage rack 10 are interchangeable and in fact, only two different upper stanchion parts 54 are required, whereby to provide a significant amount of manufacturing flexibility and a correlative reduction in inventory and tooling costs. Additionally, it will be noted that if it is necessary to rotatably position the respective crossrails 36 about their longitudinal axis in order to compensate for wind noise on different types of vehicles, it is only necessary to "re-tool" the upper stanchion parts 54 having the mounting bosses 55 arranged at a different angle instead of having to re-tool the entire stanchions 26. Moreover, by having each of the stanchions 26 fabricated of two different components, namely, the upper part 54 and lower part 44, different materials may be used for each of these parts, such as die-cast metal and injection molded plastics, for example, whereby to provide for universality of application and a wide diversity of appearances in order to best complement the aesthetics of the associated vehicle. Still another feature of the present invention resides in the fact that the assemblage consisting of the slats 18, 20 are secured to the luggage rack 10 by means of the same fastening elements, i.e. bolts 60, which secure the stanchions 26 to the vehicle roof, thereby minimizing the number of different fastening means required.

FIGS. 4–6 illustrate an alterante embodiment of the present invention wherein the luggage rack 10 is provided with a pair of transversely or laterally extending utility bars, generally designated 100, which are adapted to be mounted upon and secured to the stanchions 26. In particular, a pair of the utility bars 100 are intended to be mounted upon and extend between the laterally aligned pairs of stanchions 26, the bars 100 being secured upon the stanchions 26 by means of the aforementioned fastening elements or bolts 60. Typically, such utility bars are used for securing large boxes and other cargo within or upon the luggage rack and/or securing other cargo within or upon the luggage rack and/or securing other relatively large or bulky articles, such as ladders, boats, surfboards, bicycles, etc., upon the luggage rack 10. If desired, the utility bars may be provided with suitable tie-down members 102 which are secured to the bars 100 by fastening means, such as bolts 105, in FIG. 5. Typically, such bolts 105 are threadably engaged with a tapping plate which is disposed interiorly of the associated utility bar 100, as is indicated in phantom lines of FIG. 6, whereby to permit the tie-down members 102 to be moved laterally of the luggage rack 10, i.e., longitudinally of the utility bars 100, in order to obtain optimum positioning thereof for securing the associated cargo upon the luggage rack 10. As will be seen in FIG. 6, the utility bars 100 are provided with suitable bores in the underside thereof, as is indicated at 110, through which the bolts 60 may extend once the apertures 110 are aligned with the apertures 59 on the upper stanchion parts 54. It is to be noted that for certain applications, the utility bars 100 may extend laterally outwardly beyond the stanchions 26 a predetermined amount so that the luggage rack 10 may be adapted to carry relatively large and wide loads, such as boats, bicycle racks, etc., which might not be possible in a situation wherein the utility bars were of a length only as wide as the luggage rack 10 per se.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A luggage carrier assembly for automotive vehicles and the like having a mounting surface therefor, comprising:
    a pair of longitudinally-extending, laterally spaced side rails,
    at least one cross-rail extending laterally between said side rails,
    a plurality of stanchion assemblies disposed one adjacent each end of each of said side rails for supporting said side rails at an elevated position relative to said mounting surface of the automotive vehicle,
    at least one pad associated with each stanchion assembly,
    each of said stanchion assemblies comprising a lower stanchion part adapted to be fixedly secured to said mounting surface by first fastening means comprised of at least one fastening element extending through a generally vertically arranged opening in said lower stanchion part, said at least one pad being disposed between said lower stanchion part and said mounting surface,
    each of said stanchion assemblies also comprising an upper stanchion part adapted to be mounted on the associated lower stanchion part and thereby conceal the associated of said at least one fastening element, said upper stanchion part having exterior surfaces forming a profile substantially conforming with the profile formed by the exterior surfaces of said lower stanchion part to form at least one substantially continuous exterior surface when said upper stanchion part is properly mounted on said lower stanchion part, and
    second fastening means for detachably securing said upper stanchion part of each of said stanchion assemblies to the associated lower stanchion part, including means for positioning said upper stanchion part upon said lower stanchion part comprising a flange disposed adjacent substantially the entire periphery of said lower stanchion part, said positioning means being completely concealed by said upper stanchion part when said upper stanchion part is disposed upon said lower stanchion part.

2. The invention as set forth in claim 1 wherein said upper stanchion part is detachably secured to said lower stanchion part of each of said stanchion assemblies.

3. The invention as set forth in claim 1 wherein each end of each of said side rails is connected to one of the stanchion parts of said stanchion assemblies.

4. The invention as set forth in claim 3 wherein the ends of said side rails are telescopically connected to said one stanchion part of each of said stanchion assemblies.

5. The invention as set forth in claim 4 which comprises a male stanchion portion on said one stanchion part of each of said stanchion assemblies cooperable with a female portion on the end of the associated side rail.

6. The invention as set forth in claim 5 wherein said one stanchion part of each of said stanchion assemblies comprises the upper stanchion part of said assemblies.

7. The invention as set forth in claim 1 wherein said upper stanchion part of each of said stanchion assemblies covers substantially the entire top of the associated lower stanchion part.

8. The invention as set forth in claim 1 which comprises a pair of longitudinally-spaced, laterally-extending cross-rails.

9. The invention as set forth in claim 8 wherein said cross-rails have hollow end portions and telescopic means projecting into said end portions for supporting said cross-rails in the same general elevated horizontal plane as said side rails.

10. The invention as set forth in claim 1 wherein the flange is vertically extending.

11. The invention as set forth in claim 1, wherein each said lower stanchion part has a top portion having at least two side edges and a third edge extending between said side edges and said flange extends along and is disposed adjacent at least said side and third edges.

12. A stanchion assembly for an automotive vehicle luggage carrier, comprising
    a lower stanchion part adapted to be fixedly secured to a mounting surface on the associated vehicle by first fastening means comprised of at least one fastening element extending through a generally vertically-arranged opening in said lower stanchion part,
    a pad disposed between said lower stanchion part and said mounting surface,
    also comprising an upper stanchion part adapted to be mounted upon said lower stanchion part and having at least one exterior surface disposed in substantially the same plane as at least one of the exterior surfaces of said lower stanchion part, and thereby conceal said fastening element, and second fastening means for detachably securing said upper stanchion part of said stanchion assembly to the associated lower stanchion part, including flange means interacting between said upper stanchion part and said lower stanchion part and disposed adjacent the periphery of the top portion of said lower stanchion part and engageable with the lower portion of said upper stanchion part, said flange means being totally concealed when said upper stanchion part is disposed in engagement with said lower stanchion part.

13. The invention as set forth in claim 12 wherein said upper stanchion part is detachably secured to said lower stanchion part.

14. The invention as set forth in claim 12 which comprises a luggage carrier side rail extending longitudinally of the associated vehicle and having one end thereof secured to said stanchion assembly.

15. The invention as set forth in claim 14 wherein said one end of said side rail is connected to one of said stanchion parts.

16. The invention as set forth in claim 15 wherein said one end of said side rail is telescopically engageable with said one of said stanchion parts.

17. The invention as set forth in claim 16 which comprises a male portion on said one stanchion part and a female portion on said one end of said side rail,
said male and female portions being telescopically engageable with one another to operatively support said one end of said side rail on said stanchion assembly.

18. The invention as set forth in claim 17 wherein said male portion on said one stanchion part is on said upper stanchion part.

19. The invention as set forth in claim 12 wherein said upper stanchion part covers substantially the entire top of said lower stanchion part.

20. The invention as set forth in claim 12 wherein said stanchion assembly is operatively associated with a luggage carrier comprising a pair of longitudinally-extending, laterally-spaced side rails and at least one laterally-extending cross-rail, which comprises a male portion on one of said stanchion parts telescopically engageable with a female portion on one end of one of said side rails, and which includes a second telescopic support member adapted for engagement with one end of said cross-rail for supporting the same in the same general elevated longitudinal plane as said side rails.

21. The invention as set forth in claims 12 wherein said flange means is vertically extending.

22. The invention as set forth in claim 12, wherein said upper stanchion part has three exterior surfaces which are each disposed in substantially the same plane as at least one of the exterior surfaces of said lower stanchion part.

23. The invention as set forth in claim 12, wherein said top portion of said lower stanchion part has at least two side edges and a third edge extending between said side edges forming at least part of said periphery and said flange means is disposed adjacent at least said three edges.

* * * * *

UNITED STATES PATENT AND TRADEMARK OFFICE
CERTIFICATE OF CORRECTION

PATENT NO. : 4,428,517

DATED : January 31, 1984

INVENTOR(S) : John A. Bott

It is certified that error appears in the above-identified patent and that said Letters Patent is hereby corrected as shown below:

Column 2, line 29
 "alterante" should be --alternate--

Column 2, line 35
 "enlarger" should be --enlarged--

Column 4, line 1
 "suitble" should be --suitable--

Column 4, line 36
 After "that" insert --with--

Column 4, line 63
 "alterante" should be --alternate--

Column 5, lines 7-8
 Delete "cargo within or upon the luggage rack and/or securing other"

Column 5, line 16
 "of" should be --in--

Signed and Sealed this

Twenty-ninth Day of May 1984

[SEAL]

Attest:

Attesting Officer

GERALD J. MOSSINGHOFF

Commissioner of Patents and Trademarks